Dec. 10, 1946.  C. S. GRIMSHAW  2,412,453
GYROSCOPE
Original Filed Jan. 11, 1943

Inventor:
Charles S. Grimshaw,
by Harry E. Dunham
His Attorney.

Patented Dec. 10, 1946

2,412,453

UNITED STATES PATENT OFFICE 2,412,453

GYROSCOPE

Charles S. Grimshaw, Scotia, N. Y., assignor to General Electric Company, a corporation of New York Original application January 11, 1943, Serial No. 473,043. Divided and this application May 17, 1943, Serial No. 487,309

1 Claim. (Cl. 74—5)

This invention relates to gyroscopes, and it has for its object the provision of improved means in a gyroscope for damping nutation movements thereof.

This application is a division of my copending application Serial No. 473,043, filed January 11, 1943, which is assigned to the same assignee as this application.

When a gyroscope is used in certain applications, particularly where it is subjected to erecting forces, such as in the sighting mechanism of the aforementioned application, it is subject to rather violent nutation movements of its spin axis. This invention contemplates the provision of simple and reliable means for damping these movements.

In accordance with this invention in one form thereof, a weighted annular ring is provided and it is mounted on the gyroscope with its axis substantially coincident with the spin axis of the gyroscope. The connecting means between the annular member and the gyroscope permit movement of the annular member with reference to the gyroscope about two axes at right angles to each other. Furthermore, the connecting means introduce frictional forces which resist the movements of the annular member about its axes so that the tendency of the gyroscope spin axis to nutate is obviated.

Figure 1:
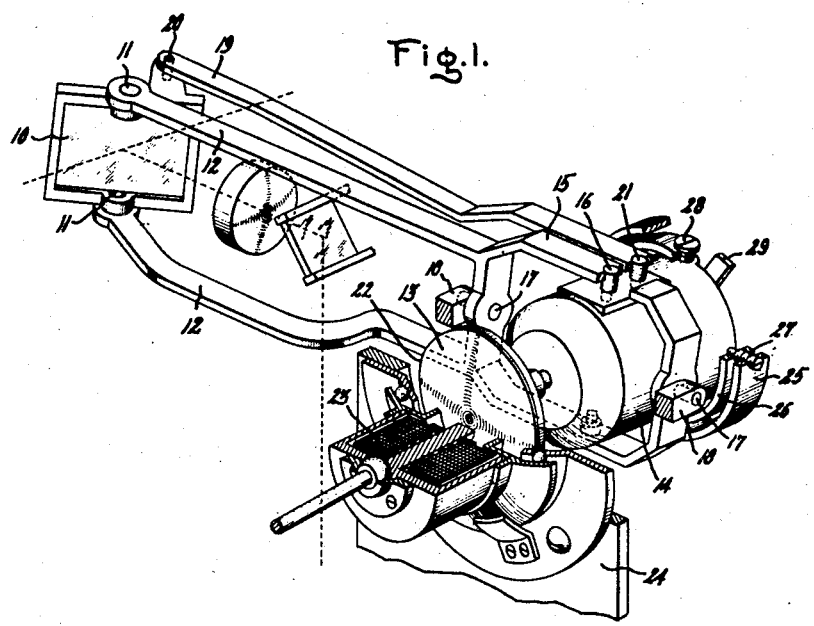
Figure 2:
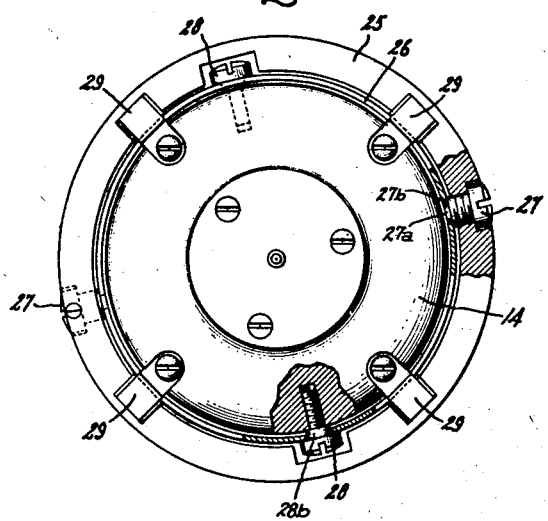

For a more complete understanding of this invention, reference should be had to the accompanying drawing in which Fig. 1 is a perspective view illustrating sighting mechanism provided with a gyroscope embodying this invention; and Fig. 2 is an end elevation view of the gyroscope used in the apparatus of Fig. 1, the figure being drawn to a larger scale than Fig. 1.

Referring to the drawing, this invention has been shown as applied to the sighting mechanism of my aforementioned copending application. It is to be understood, however, that it is applicable equally as well to gyroscopes employed in various other applications where it is desired to damp the nutation movements of the gyroscope's spin axis.

As shown in the drawing, the sighting mechanism of the aforementioned application comprises a transparent reflector member 10 which may be formed of clear glass, and through which the object to be sighted is observed. This sighting member is provided with shafts 11 mounted in two arms 12.

The motion of the reflector 10 is controlled by means of a gyroscope 13 arranged in accordance with this invention. The gyroscope is driven by means of a motor 14 which is mounted in a ring 15 by means of shafts 16. This ring 15 also functions to support the arms 12, as shown.

The ring 15 is mounted for movement on an axis at right angles to the axis of movement of the gyroscope in the ring, and for this purpose it is provided with shafts 17 journaled in fixed bearings 18. The transparent reflector 10 is connected to the gyroscope motor by means of a link 19 pivotally connected to the transparent reflector 10 by means of a shaft 20, as shown, and to the motor by means of a shaft 21. The connection between the gyroscope and the reflector 10 is such that the reflector is moved through but one-half of the angle of movement of the gyroscope about the shaft 16. It has, however, the same angular movement as the gyroscope about the shafts 17, the reflector being driven through the ring 15 and the arms 12.

As pointed out in detail in the aforementioned copending application, the motion of the gyroscope is controlled by means of an eddy current erecting disk 22 and a coacting magnet 23, these two members constituting a magnetic coupling between the gyroscope and a fixed support 24 for the magnet. Because of the erecting forces applied by the magnetic coupling, the gyroscope is subject to violent nutation movements under certain operating conditions. In accordance with this invention this effect is obviated by a nutation damper which is provided on the end of the gyroscope assembly opposite to the eddy current disk 22.

This damper comprises an annular weighted ring 25 which is mounted on an inner flexible ring 26 by means of screws 27 located on the opposite ends of a diameter. It will be observed that these screws are in threaded engagement in apertures provided for them in the outer ring and that they have reduced extensions 27a which are received in holes provided for them in the inner ring 26 and which may rotate freely in these holes. The reduced extensions provide shoulders 27b which bear against the outer surface of the inner ring as shown. The inner ring 26 is pivoted to the motor 14 by means of screws 28 also located at the opposite ends of a diameter, but which diameter is located at right angles to the axis of movement of the ring 25 with reference to the ring 26. The screws 28 have sections 28b under their heads which are directed through apertures provided for them in the inner ring and which may rotate freely with reference to this ring. The inner ends of these screws are threaded in the bores provided for them in the motor casing.

By adjusting the screws 27 and 28 it is possible to vary the frictional forces between the inner ring and the shoulders 27b of the screws 27 and between the inner ring and the heads of the screws 28. In other words, it is possible to vary the frictional forces existing between the two rings, 25 and 26 and between the ring 26 and the gyroscope. Therefore, as the spin axis of the gyroscope tends to nutate relative motions are produced between the two rings 25 and 26 and also between the ring 26 and the gyroscope.

These frictional forces cause the nutation to be damped.

Circumferentially spaced stops 29 are provided on the motor 14 which engage the weighted ring 25 to limit its movements, the stops thereby providing some impact damping. Preferably, these stops will be made of a suitable resilient material, such as rubber.

While I have shown a particular embodiment of my invention, it will be understood of course that I do not wish to be limited thereto since many modifications may be made, and I therefore contemplate by the appended claim to cover any such modifications as fall within the true spirit and scope of my invention.

What I claim as new and desire to secure by Letters Patent of the United States is:

In combination, a gyroscope, a rigid weighted ring secured to one end of said gyroscope and having its axis substantially coincident with the spin axis thereof, a second relatively flexible ring interposed between said first ring and said gyroscope, means pivotally connecting said rings together for pivotal relative movement on a diameter, means pivotally connecting said second ring to said gyroscope for movement on a diameter at right angles to said first-named diameter, said pivotally connecting means introducing frictional forces resisting the relative movement between said rings and between said second ring and said gyroscope, and resilient stop means for limiting the movement of said first ring relative to said gyroscope.

CHARLES S. GRIMSHAW.